(12) United States Patent
Kim et al.

(10) Patent No.: US 7,787,516 B2
(45) Date of Patent: Aug. 31, 2010

(54) WIRELESS COMMUNICATION SYSTEM FOR REDUCING RANGING TIME

(75) Inventors: Jae-hyon Kim, Suwon-si (KR); Young-hwan Kim, Hwaseong-si (KR); Seong-soo Lee, Suwon-si (KR); Joonhyuk Kang, Seoul (KR); Jaehwan Kim, Yeosu-si (KR); Yungil Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1056 days.

(21) Appl. No.: 11/501,829

(22) Filed: Aug. 10, 2006

(65) Prior Publication Data

US 2007/0133660 A1    Jun. 14, 2007

(30) Foreign Application Priority Data

Dec. 9, 2005 (KR) .................. 10-2005-0120822

(51) Int. Cl.
H04B 1/00 (2006.01)
(52) U.S. Cl. .................. 375/131; 375/138; 375/239
(58) Field of Classification Search .................. 375/131, 375/138, 239, 256, 140–153
See application file for complete search history.

(56) References Cited

U.S. PATENT DOCUMENTS

| 2004/0240527 A1* | 12/2004 | Giannakis et al. | 375/138 |
| 2005/0089083 A1* | 4/2005 | Fisher et al. | 375/130 |
| 2008/0259896 A1* | 10/2008 | Sahinoglu et al. | 370/345 |

* cited by examiner

*Primary Examiner*—Shuwang Liu
*Assistant Examiner*—James M Perez
(74) *Attorney, Agent, or Firm*—Sughrue Mion, PLLC

(57) ABSTRACT

A wireless communication system and a method for reducing a ranging time. The communication system includes a main synchronization block group which processes the transceived signal and determines whether the transceived signal is a signal desired by a transmitting device when a receiving device re-transmits the transceived signal to the transmitting device; a ranging block which measures a distance between the transmitting device and the receiving device using a ranging signal when the transceived signal is the desired signal of the transmitting device based on the determination of the main synchronization block group and when the transceived signal is the ranging signal; and a symbol synchronization block which detects a start point and an end point of a symbol forming the signal when the transceived signal from the receiving device is a data communication signal. Accordingly, the fast ranging is feasible and channel occupation time can be shortened.

38 Claims, 6 Drawing Sheets

WIRELESS COMMUNICATION SYSTEM FOR REDUCING RANGING TIME

CROSS-REFERENCE TO RELATED APPLICATIONS

This application claims the benefit under 35 U.S.C. §119 (a) from Korean Patent Application No. 2005-120822 filed on Dec. 9, 2005 in the Korean Intellectual Property Office, the entire disclosure of which is incorporated herein by reference.

BACKGROUND OF THE INVENTION

1. Field of the Invention

Systems and methods consistent with the present invention relate to a wireless communication for reducing a ranging time. More particularly, the present invention relates to a wireless communication method and a wireless communication system with a reduced ranging time for shortening a synchronization process by separating the synchronization process into a plurality of phases and determining whether a received signal is ranging communication or data communication.

2. Description of the Related Art

The Institute of Electrical and Electronics Engineers (IEEE) 802.15.4 standard has suggested a full function device (FFD) and a reduced function device (RFD). The FFD performs wireless communications with other devices without a separate intermediate entity, and the RFD performs wireless communications only via an intermediate entity such as the FFD.

Localization is a technique to acquire a position of a device using the communications with other devices. Ranging is a process conducted on the physical layer to measure a relative distance between two devices.

The IEEE 802.15.4a standard meeting has adopted the ranging technique as an obligatory technique, and the spirited discussion is made on whether the ranging technique has a protocol. In case there is a protocol, a transmitting device which intends to measure a distance is assigned a channel and measures a relative distance by transmitting and receiving a radio frequency (RF) signal for the ranging to and from a receiving device through the assigned channel. In case there is no protocol, the transmitting device performs the synchronization of the RF signal and measures the distance to the receiving device under a certain assumption without utilizing the protocol.

If the ranging technique is applied to an ultra wide band (UWB) system, in practice, the transmitting device that intends to measure the distance needs to consider accuracy, measurement time, hardware complexity, and power consumption of the distance measurement. Particularly, the fast distance measurement is required when the measurement is needed to promptly cope with an emergency such as a fire, a disaster, and a military event, or when the device is mobile.

Various patent applications and papers have proposed methods to rapidly measure the distance between devices.

In the paper entitled "A Two Step Time of Arrival Estimation Algorithm for Impulse Radio Ultra Wideband Systems", Mitsubishi Electric Research Lavatories Inc., 2005, the synchronization is performed during the ranging under the assumption that the synchronization is flawless.

The paper describes that the synchronization is performed and then the ranging is conducted after the synchronization without utilizing a protocol. As a result, the time taken for the synchronization increases.

Meanwhile, in a ranging method in conformity with a protocol, the ranging is carried out by repeatedly transmitting a signal in a channel occupied according to the protocol. Since the ranging protocol is suggested in the upper layer, it is required to transmit and receive a signal to prepare for the ranging in conformity with the ranging protocol in the distance measurement In brief, some time is required to prepare for the ranging.

Accordingly, the ranging time is likely to increase because the methods described in the patent applications and the papers of the related art need to perform the synchronization with respect to ranging techniques that do not utilize the protocol, and to transmit and receive the signal before the ranging with respect to the ranging techniques that utilize the protocol.

Typically, the synchronization discriminates a desired signal of the transmitting device from noise among several signals received from the receiving device, and arranges for the recovery of the received signal by detecting a start point and the end point of a symbol.

However, the discrimination between the desired signal and the noise is required both in the ranging and the data communications, whereas the detection of the start point and the end point of the symbol is required only in the data communications.

If it is possible to separate the detection of the start point and the end point of the symbol from the synchronization, the detection of the start point and the end point of the symbol can be executed in the data communications without detecting the start and end points of the symbol in the ranging. That is, the ranging time can be reduced.

SUMMARY OF THE INVENTION

An aspect of the present invention is to address the above-mentioned and other problems and disadvantages occurring in the conventional arrangement, and to provide a wireless communication system for reducing a ranging time so that the synchronization can be shortened by separating the synchronization into a plurality of phases according to the ranging or the data communications.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

In accordance with an aspect of the present invention, a wireless communication system for reducing a ranging time includes a number of devices, which transceive signals for communications. The devices include a transmitting device transmitting a ranging signal to the receiving device, where the transmitting device detects a position of a device, and the signal is constructed using a preamble that includes at least one chip which has an impulse signal indicative of information; at least one frame which is constructed using a plurality of chips and forms a code relating to the device depending on which chip contains a signal; at least one time hopping (TH) code block which is constructed using a plurality of frames; and a direct sequence (DS) code block which forms one bit with the plurality of TH code blocks and is constructed using a plurality of bits.

The wireless communication system may include a main synchronization block group which processes the transceived signal and determines whether the transceived signal is a signal desired by the transmitting device when the receiving device re-transmits the transceived signal to the transmitting device; a ranging block which measures a distance between the transmitting device and the receiving device using a ranging signal when the transceived signal is the desired signal of the transmitting device according to the determination of the main synchronization block group and the transceived signal is the ranging signal; and a symbol synchronization block which detects a start point and an end point of a symbol forming a signal when the transceived signal from the receiving devices is a data communication signal.

The main synchronization block group may include a chip synchronization block which determines in which chip the impulse signal resides; a frame synchronization block which determines in which chip the impulse signal resides within the frame; and a code synchronization block which acquires a TH code with respect to each frame in the TH code block and determines whether the acquired TH code matches a TH code generated at the transmitting device.

The chip synchronization block may include a chip template generator which generates the same chip template signal as an impulse signal generated at the transmitting device; a chip processor which calculates a value by multiplying a signal sequence, which is generated by integrating all chips in the frame and summing up the integrated values of all the chips within the TH code block, by the chip template signal generated at the chip template generator; and a chip determiner which determines whether the value exceeds a predefined threshold.

When the value exceeds the predefined threshold, the chip determiner may determine that the impulse signal is generated in a corresponding position in the chip.

The chip synchronization block may further include a chip template shifter which designates a position of the chip template.

An interval at which the chip template is shifted by the chip template shifter may be smaller than a width of the impulse signal.

When the value does not exceed the predefined threshold, the chip determiner may cause the chip template shifter to shift the position of the chip template.

When the position of the chip template is shifted, the chip processor may repeat the calculation of the value using the shifted chip template.

The operation of shifting the position of the chip template and the operation of calculating the value may be repeated until the value exceeds the predefined threshold.

The wireless communication system may further include a first switch which is interposed between the chip determiner and the frame synchronization block, and switches to feed the transceived signal to the frame synchronization block when the value exceeds the predefined threshold.

The frame synchronization block may include a frame template generator which generates a frame template which equals the chip in size; a frame processor which calculates a value by multiplying a signal sequence which is generated by integrating frames in the TH code block, by the frame template; and a frame determiner which determines whether the value exceeds a predefined threshold.

When the value exceeds the predefined threshold, the frame determiner may determine that the impulse signal is contained in a corresponding chip in the frame.

The frame synchronization block may further include a frame template shifter which designates a position of the frame template.

An interval at which the frame template is shifted by the frame template shifter may be the same as the size of the chip.

When the value does not exceed the predefined threshold, the frame determiner may cause the frame template shifter to shift the position of the frame template.

When the position of the frame template is shifted, the frame processor may repeat the calculation of the value using the shifted frame template.

The shifting of the position of the frame template and the calculating of the value may be repeated until the value exceeds the predefined threshold.

The wireless communication system may further include a second switch which is interposed between the frame determiner and the code synchronization block, and switches to feed the transceived signal to the code synchronization block when the value exceeds the predefined threshold.

The code synchronization block may include a TH code generator which generates the same signal as the transceived signal which is originated from the transmitting device and transmitted to the receiving device; a TH code processor which calculates a value by comparing the TH code of the TH code blocks, which is acquired at the frame synchronization block, with the signal generated at the TH code generator; and a TH code determiner which determines whether the transceived signal is a signal desired by the transmitted device according to whether the value exceeds a predefined threshold.

The code synchronization block may further include a TH code shifter which designates a position of the TH code from the TH code generator.

An interval at which the TH code is shifted by the TH code shifter may be the same as the size of the TH code block.

When the position of the TH code is shifted, the TH code processor may acquire a plurality of values by repay calculating the value using the shifted TH code.

When a maximum value of the values exceeds a threshold, the TH code determiner may determine that the transceived signal is a signal desired by the transmitting device.

When the maximum value of the values does not exceed the threshold, the TH code determiner may cause the chip synchronization block and the frame synchronization block to repeat the synchronization.

The wireless communication system may further include a third switch which is interposed among the TH code determiner, the symbol synchronization block, and the ranging block, wherein, when the maximum value of the values exceeds the threshold, the third switch feeds a ranging signal to the ranging block when the transceived signal is the ranging signal, and feeds the transceived signal to the symbol synchronization block when the transceived signal contains communication data.

The symbol synchronization block may include a DS code generator which generates a signal forming the same DS code as a DS code which is generated at the transmitting device and transmitted to the receiving device; a symbol processor which calculates a value by multiplying the transceived signal by the signal generated at the DS code generator; and a DS code determiner which determines whether the symbol synchronization is completed by comparing the value calculated at the symbol processor with a predefined threshold.

The symbol synchronization block may further include a DS code shifter which shifts the signal generated at the DS code generator by one bit.

The symbol processor may calculate the value by multiplying the transceived signal and a shifted signal every time the DS code shifter shifts the signal by one bit.

When the value exceeds the predefined threshold, the DS code determiner may determine the completion of the symbol synchronization.

When the symbol synchronization is completed, a verification operation may be performed to verify whether timing information acquired from a receiving end is a symbol period of the signal sequence desired by the transmitting device.

When the value falls below the predefined threshold, the DS code determiner may calculate the value by repeatedly operating the DS code shifter and the symbol processor until the value exceeds the predefined threshold.

The ranging block may include an energy detector which acquires a start point of the symbol by detecting an energy of the ranging signal; and a TOA estimator which measures the distance between the transmitting device and the receiving device using the start point of the symbol.

The wireless communication system may further include a squarer which squares the transceived signal and provides the squared signal to the chip synchronization block, the frame synchronization block, and the code synchronization block.

The wireless communication system may further include a clock controller which determines a cycle of the chip template generation, the frame template generation, and the TH code generation by controlling the chip template generator, the frame template generator, and the TH code generator.

According to yet another aspect of the present invention, a method for reducing ranging time in a wireless communication system is provided. The method includes processing a transceived signal to determine whether the transceived signal is a signal desired by a transmitting device when a receiving device re-transmits the transceived signal to the transmitting device, measuring a distance between the transmitting device and the receiving device using a ranging signal when the transceived signal is the ranging signal and is also a desired signal of the transmitting device according to said determination, and detecting a start point and an end point of a symbol forming the transceived signal when the transceived signal from the receiving device is a data communication signal.

BRIEF DESCRIPTION OF THE DRAWING FIGURES

These and/or other aspects of the present invention will become more apparent and more readily appreciated from the following description of exemplary embodiments thereof, with reference to the accompanying drawings, in which.

DETAILED DESCRIPTION OF THE EXEMPLARY EMBODIMENTS

Figure 1:
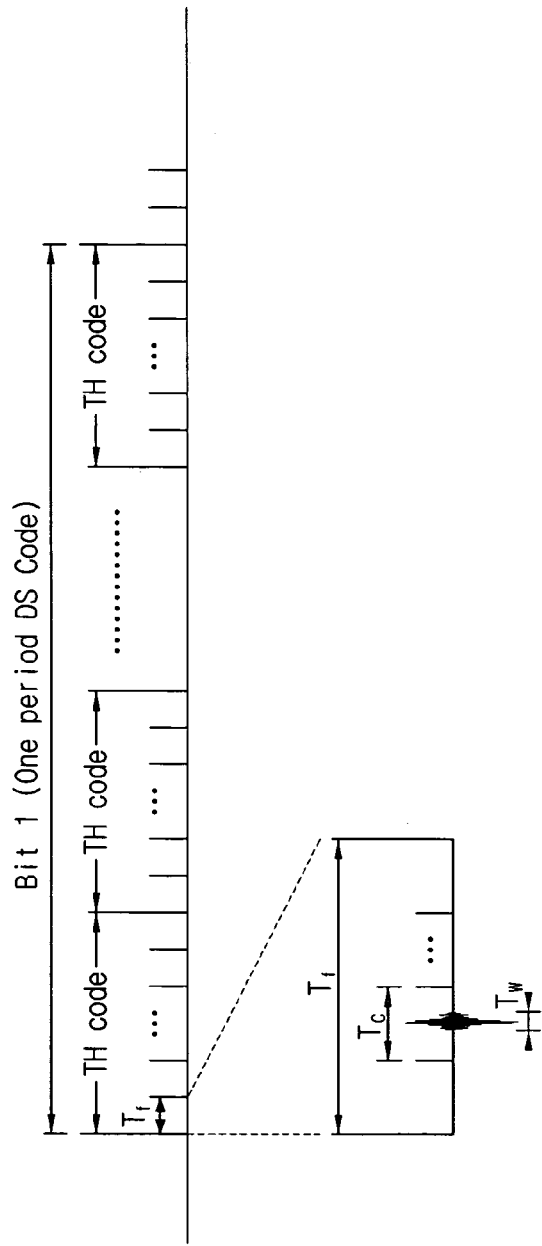
FIG. 1 is a diagram illustrating an RF signal used in a wireless communication system for reducing a ranging time according to an exemplary, non-limiting embodiment of the present invention.

Certain exemplary, non-limiting embodiments of the present invention will now be described in greater detail with reference to the accompanying drawings.

In the following description, the same drawing reference numerals and characters are used to denote analogous elements, even in different drawings. The matters defined in the following description, such as detailed construction and element descriptions, are provided as examples to assist in a comprehensive understanding of the invention and not by way of limitation. Also, well-known functions or constructions are not described in detail, since they would obscure the present invention in unnecessary detail.

FIG. 1 is a diagram illustrating an RF signal used in a wireless communication system for reducing a ranging time according to an exemplary embodiment of the present invention.

In the wireless communication system for reducing the ranging time, the RF signal is transmitted from a transmitting device, processed at a receiving device, and transmitted back to the transmitting device. By use of the RF signal, it is possible to measure a distance between the two devices. In an exemplary embodiment of the present invention, the RF signal is implemented using an impulse signal.

The RF signal consists of a preamble alone. The preamble is constructed by applying a direct sequence (DS) coding and a time hopping (TH) coding.

The DS code is a code indicative of a sign of a signal, and constructed by arranging negative or positive numbers. For instance, the DS code can be represented as 1, −1, 1, −1, −1, −1, 1, 1, 1, 1, −1, . . . .

The TH code is divided into a certain number of time slots in a specific period, and used to determine which time slot contains information. For instance, the TH code can be represented as 3, 2, 4, 5, 1, 2, . . . .

As such, the preamble using the DS code and the TH code includes DS codes of a plurality of bits. The DS code of each bit includes a plurality of TH code blocks. Each TH code block includes a plurality of frames $T_f$ containing information relating to a plurality of devices. Each frame $T_f$ includes a plurality of chips Tc having an impulse signal.

Herein, the number of TH code blocks within a 1-bit DS code denotes the number of data forming the TH code. Provided that the TH code consists of six digits 1, 5, 4, 3, 7, 3, the number of TH code blocks is six. The number of frames generated in each TH code block is equal to the number of the ranging devices. Provided that the number of devices is 20, the number of frames in each TH code block is 20. Accordingly, when there are six TH code blocks in the 1-bit DS code and twenty frames in each TH code block, the total number of frames in the 1-bit DS code is 120.

The frame has the plurality of chips that can hold the impulse signals indicative of the TH codes. The number of the chips is the same as the number indicative of the TH codes. For example, when the number of chips is seven, the TH code 1, 5, 4, 3, 7, 3 is possible but 2, 8, 4, 5, 5, 4 is impossible. The TH code can use the digits up to seven with respect to the seven chips because the TH code indicates the order of the chips in the frame. As a result, the digit 8 of the TH code 2, 8, 4, 5, 5, 4 is unattainable.

$T_W$ is the width of the impulse in one chip. The position of the impulse in one chip may change. The distance between the devices can be measured according to the position of the impulse in the chip.

Figure 4A:
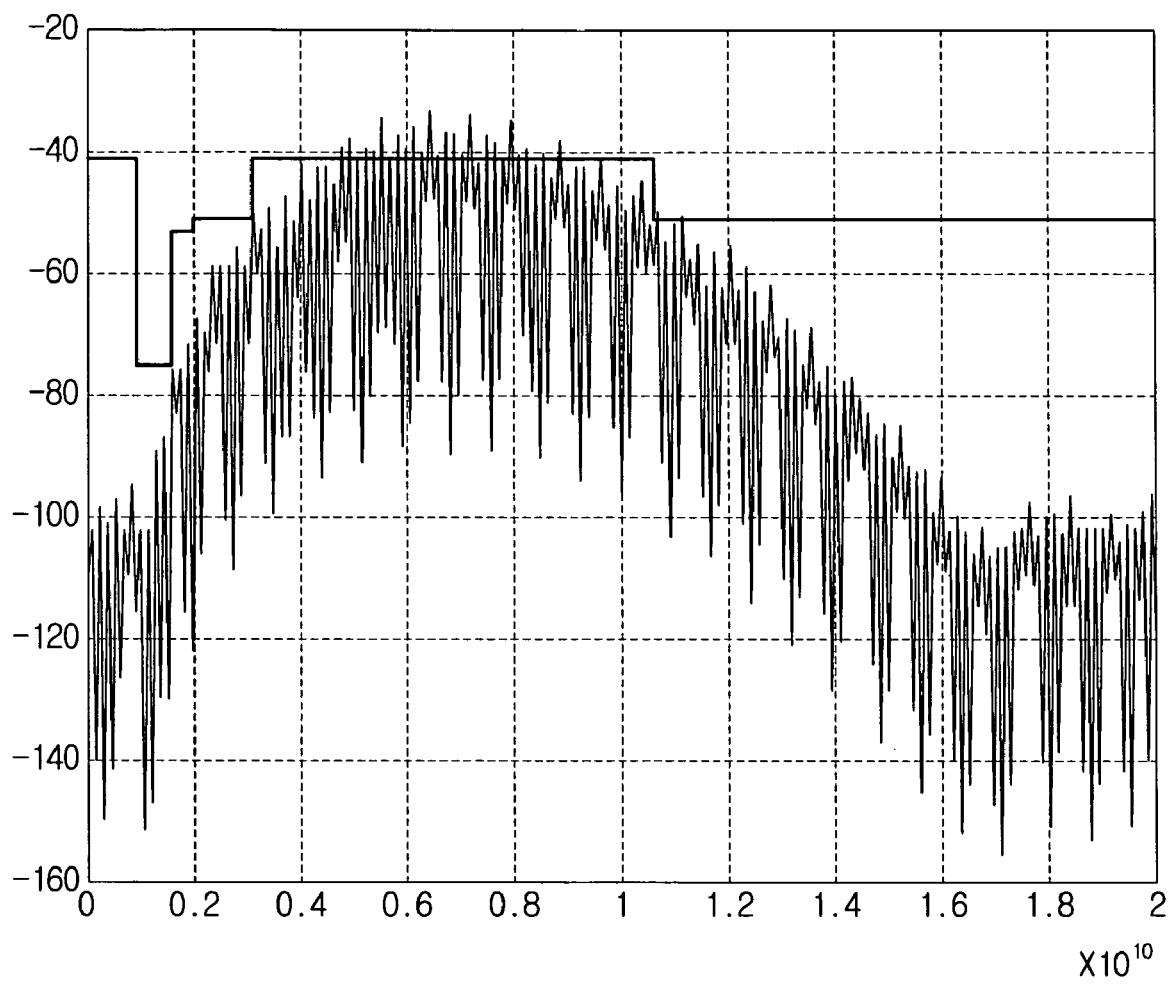
FIGS. 4A and 4B are graphs showing a density of a power spectrum when a TH code is adopted and when both a DS code and a TH code are adopted, respectively.
Figure 4B:
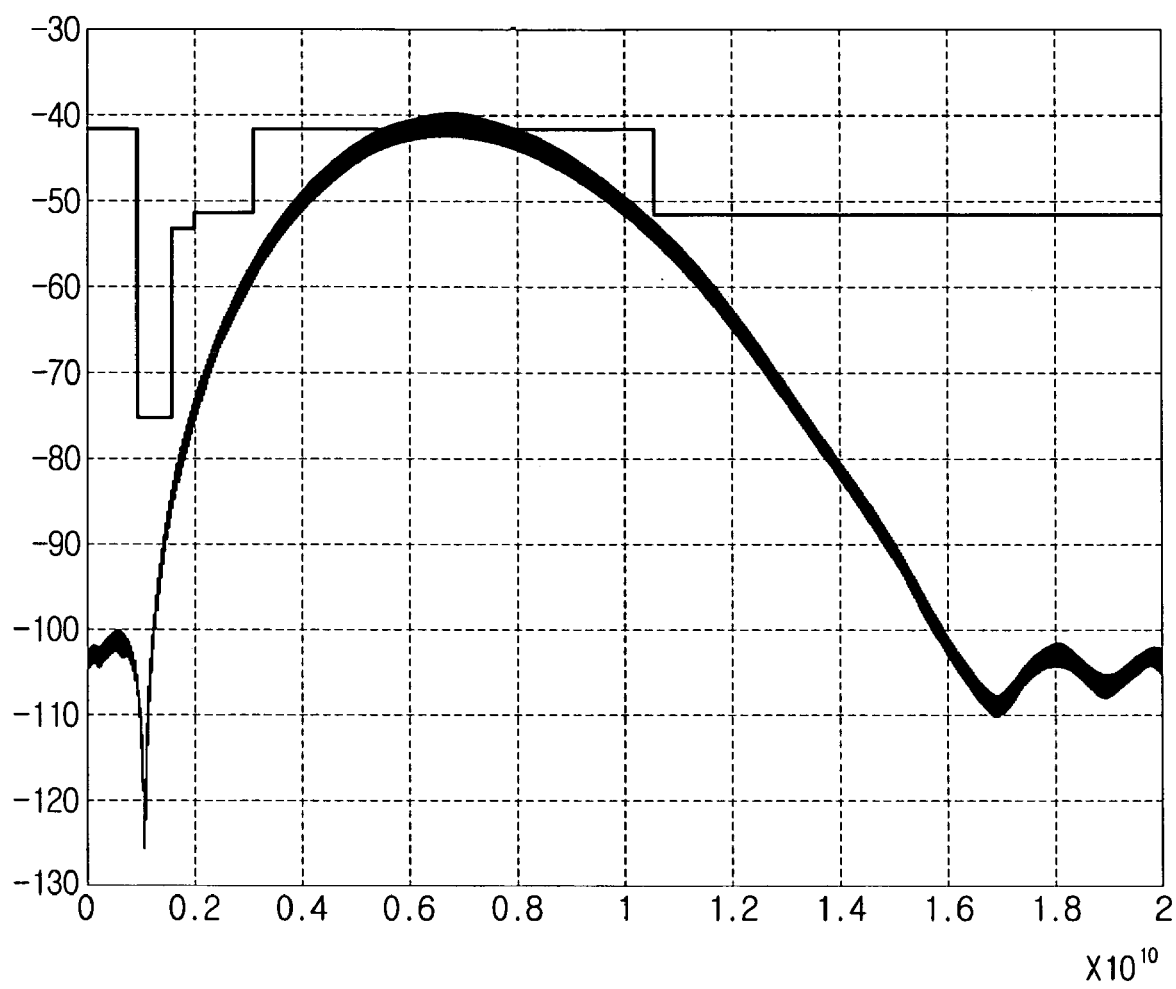

FIGS. 4A and 4B are graphs showing a density of a power spectrum when the TH code is adopted and when both the DS code and the TH code are adopted, respectively. As shown in FIGS. 4A and 4B, the randomness increases according to the use of the DS code in comparison with the case when merely the TH code is adopted. Thus, the smoothing effect of the power spectrum is produced and the stability of the frequency characteristic can be obtained.

Figure 2:
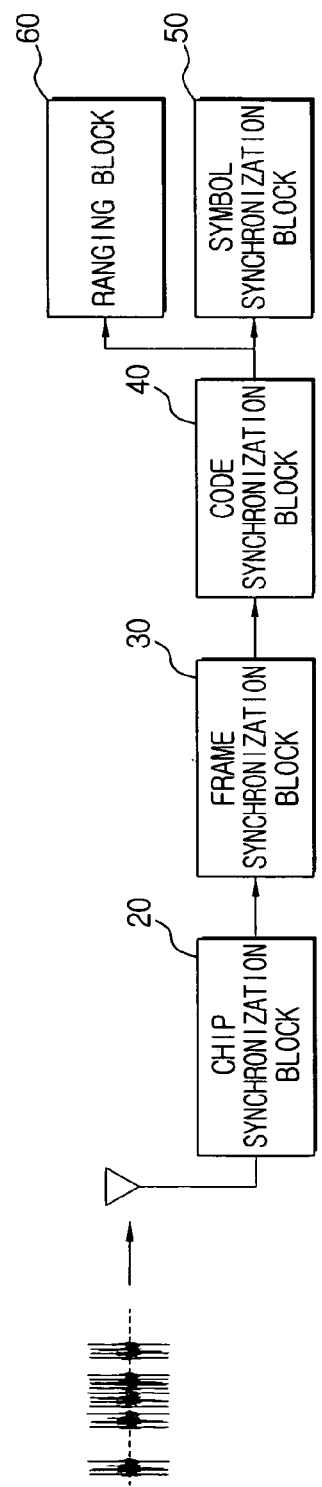
FIG. 2 is a simplified block diagram of the wireless communication system for reducing the ranging time taken to perform synchronization and ranging according to an exemplary, non-limiting embodiment of the present invention.

FIG. 2 is a simplified block diagram of the wireless communication system for reducing the ranging time taken to perform the synchronization and the ranging according to an exemplary embodiment of the present invention.

Referring to FIG. 2, the wireless communication system includes a chip synchronization block 20, a frame synchronization block 30, a code synchronization block 40, a ranging block 60, and a symbol synchronization block 50.

The chip synchronization block 20 determines where the impulse signal is positioned in a chip. The frame synchronization block 30 determines in which chip the impulse signal resides within a frame. The code synchronization block 40 acquires a TH code with respect to the frames at the same position in the respective TH code blocks, and determines whether the acquired TH code matches a TH code generated at the transmitting device. The ranging block 60 calculates the distance between the devices using the information aggregated through the synchronization. The symbol synchronization block 50 detects a start point of the symbol when a data signal, rather than a ranging signal, is input.

Figure 3:
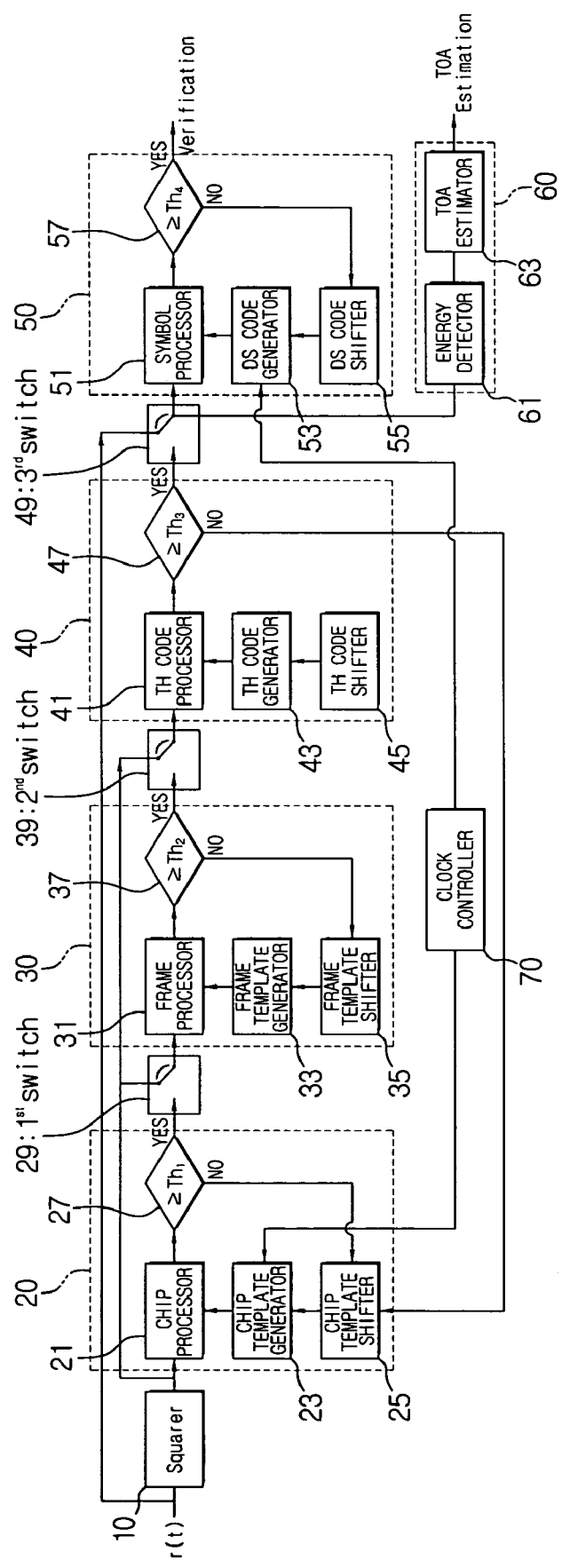
FIG. 3 is a detailed block diagram of the wireless communication system for reducing the ranging time taken to perform synchronization and ranging according to an exemplary, non-limiting embodiment of the present invention.

FIG. 3 is a detailed block diagram of the wireless communication system of FIG. 2. As shown in FIG. 3, the wireless communication system includes a squarer 10, the chip synchronization block 20, a first switch 29, the frame synchronization block 30, a second switch 39, the code synchronization block 40, a third switch 49, the ranging block 60, the symbol synchronization block 50, and a clock controller 70.

The square 10 squares the RF signal received at the transmitting device in order to perform the chip synchronization phase, the frame synchronization phase, and the code synchronization phase by use of only the time slot information of the received signal by eliminating the polarity of the received RF signal.

The chip synchronization block 20 includes a chip processor 21, a chip determiner 27, a chip template generator 23, and a chip template shifter 25.

The chip processor 21 integrates all chips in one frame, and sums up the integrated values of all the chips in the respective frames within one TH code block. Next, the chip processor 21 generates a signal sequence with respect to one TH code, and acquires a $Z_1$ value by multiplying the signal sequence by a chip template signal generated at the chip template generator 23.

The chip template generator 23 generates the chip template signal. When the received signal has no noise, the chip template signal is the impulse signal in the form initially generated at the transmitting device. The chip template generator 23 determines a cycle of the chip template generation according to a signal provided from a clock controller 70.

The chip template shifter 25 designates the position of the chip template, which is compared with the signal sequence. The chip template shifter 25 moves and designates the position of the chip template at an interval over a certain time period. In moving and designating the position of the chip template, it is preferable that the interval at which the chip template shifter 25 shifts the chip template is equal to or smaller than the width of the impulse signal.

The chip determiner 27 determines whether a product of the signal sequence of the chip processor 21 and the chip template signal of the chip template generator 23 exceeds a predefined threshold Th. When the product exceeds the threshold Th, a determination is made that the received signal is present at the corresponding position in the chip. Subsequently, the frame synchronization progresses.

By contrast, when the product does not exceed the threshold Th, the chip template shifter 25 designates a next position of the chip template and the chip template generator 23 generates a chip template at the next position. The shifted chip template is multiplied by the signal sequence. The chip determiner 27 again determines whether the product exceeds the threshold Th. This process is repeated until the product exceeds the threshold Th.

The first switch 29 is interposed between the chip synchronization block 20 and the frame synchronization block 30. When the product of the two signals exceeds the threshold according the determination of the chip determiner 27, the first switch 29 switches to feed the received signal from the squarer 10 to the frame synchronization block 30.

The frame synchronization block 30 includes a frame processor 31, a frame template generator 33, a frame template shifter 35, and a frame determiner 37.

The frame processor 31 integrates the frames in a TH code block. Each chip in the respective frames is integrated with the other chips at the same position. Upon the completion of the integration, the frames in the TH code block forms a signal sequence. The frame processor 31 calculates a $Z_2$ value by multiplying the signal sequence by a frame template generated at the frame template generator 33.

The frame template generator 33 generates the frame template. The frame template is of the same size as the chip. The frame template generator 33 uses an equal gain combining (EGC) scheme. When the frame template is continuously generated up to a specific period according to an initial template generation condition defined by the clock controller 70, the power is subject to the attenuation as the signal passes through a radio channel along various paths. By minimizing the power attenuation using the EGC scheme, the frame synchronization can be executed more accurately. The frame template generator 33 determines a cycle of the frame template generation under the control of the clock controller 70.

The frame determiner 37 determines whether the $Z_2$ value, which is the product of the signal sequence of the frames in the TH code block and the chip unit of the frame template generated at the frame template generator 33, exceeds a predefined threshold Th. According to a result of the determination, when the $Z_2$ value exceeds the threshold Th, the frame determiner 37 determines that the corresponding chip contains the impulse signal. In contrast, when the $Z_2$ value does not exceed the threshold, the frame determiner 37 signals the frame template shifter 35 to shift the frame template.

The frame template shifter 35 moves and designates the position of the frame template by the chip interval. When the $Z_2$ value does not exceed the threshold according to the determination at the frame determiner 37, the frame template shifter 35 shifts the frame template.

As such, the frame synchronization block 30 can learn which chip of the frames contains the impulse signal. Hence, it is possible to extract the code value with respect to the respective TH code blocks. For example, when the impulse signal is contained in the third chip in the first frame, the TH code value of the first frame is 3. When the impulse signal is contained in the second chip in the second frame, the TH code value of the second frame is 2. Thus, the TH code is 3, 2, . . . .

The second switch 39 is interposed between the frame determiner 37 and the code synchronization block 40. When the $Z_2$ value exceeds the threshold according to the determination at the frame determiner 37, the second switch 39 switches to feed the squared signal to the code synchronization block 40.

The code synchronization block 40 includes a TH code processor 41, a TH code generator 43, a TH code shifter 45, and a TH code determiner 47.

The TH code processor 41 compares the TH code of the respective TH code blocks acquired through the chip synchronization block 20 and the frame synchronization block 30, and a TH code forming the 1-bit DS code generated by the transmitting device, and thus determines whether the received signal is the RF signal desired by the transmitting device. For this determination, the TH code processor 41 calculates a $Z_3$ value by multiplying the two TH codes by the 1-bit DS code unit and then integrates the product. Next, the TH code processor 41 calculates a $Z_3$ value anew every time the position of the RF signal is shifted by the TH code shifter 45.

The TH code generator 43 generates the same RF signal as the RF signal which is originated from the transmitting device and transmitted to the receiving device. That is, the TH code generator 43 generates an RF signal indicative of the TH code.

The TH code shifter 45 designates the position of the RF signal such that the RF signal generated at the TH code generator 43 can be shifted by the size of the TH code block.

The TH code determiner 47 determines whether a maximum value of a plurality of $Z_3$ values calculated for every shift of the RF signal at the TH code processor 41, exceeds a predefined threshold Th. According to a result of the determination, when the maximum value of the $Z_3$ values exceeds the threshold Th, the TH code determiner 47 determines that the received signal is the desired signal of the transmitting devices, and thus proceeds to a next phase.

In contrast, when the maximum value of the $Z_3$ values falls below the threshold Th, the TH code determiner 47 determines the error m the chip synchronization phase and the frame synchronization phase, and controls the process to repeat the chip synchronization phase and the frame synchronization phase.

The third switch 49 is interposed between the TH code determiner 47 and the symbol synchronization block 50. When the TH code determiner 47 determines that the received signal is the desired signal of the transmitting device, the third switch 49 switches to feed the received signal to the symbol synchronization block 50.

The symbol synchronization block 50 includes a symbol processor 51, a DS code generator 53, a DS code shifter 55, and a DS code determiner 57.

The symbol processor 51 multiplies the received signal by an RF signal generated at the DS code generator 53. That is, the symbol processor 51 multiplies the received signal and the RF signal originated from the DS code generator 53 every time the DS code shifter 55 shifts the RF signal generated at the DS code generator 53 by one bit.

The DS code generator 53 generates the RF signal that can form the same code as the DS code which is generated at the transmitted device and which is transmitted to the receiving device.

The DS code shifter 55 shifts the RF signal generated at the DS code generator 53 by a certain width, for example, all the bits in the DS code are shifted by one bit of the DS code.

The DS code determiner 57 determines the completion of the symbol synchronization when the product of the received signal and the RF signal, which is calculated at the symbol processor 51, exceeds a predefined threshold Th. Upon the completion of the symbol synchronization, a verification phase progresses to verify whether the timing information acquired from a receiving end is the symbol period of the signal sequence desired by the transmitting device. In contrast when the product of the two signals falls below the threshold Th the product of the signals is compared with the threshold Th while the DS code in shifted until the symbol synchronization is completed.

As such, the start point and the end point of the respective symbols can be acquired at the symbol synchronization block 50, and the result is used for the data communications. In other words, the symbol synchronization phase is unnecessary in the ranging phase which measures the distance between two devices using merely the start point of the symbol.

The ranging block 60 includes an energy detector 61 which acquires the start point of the symbol by detecting the energy of the received signal, and a time of arrival "TOA" estimator 63 which measures the distance between the two devices using the start point of the symbol.

Figure 5:
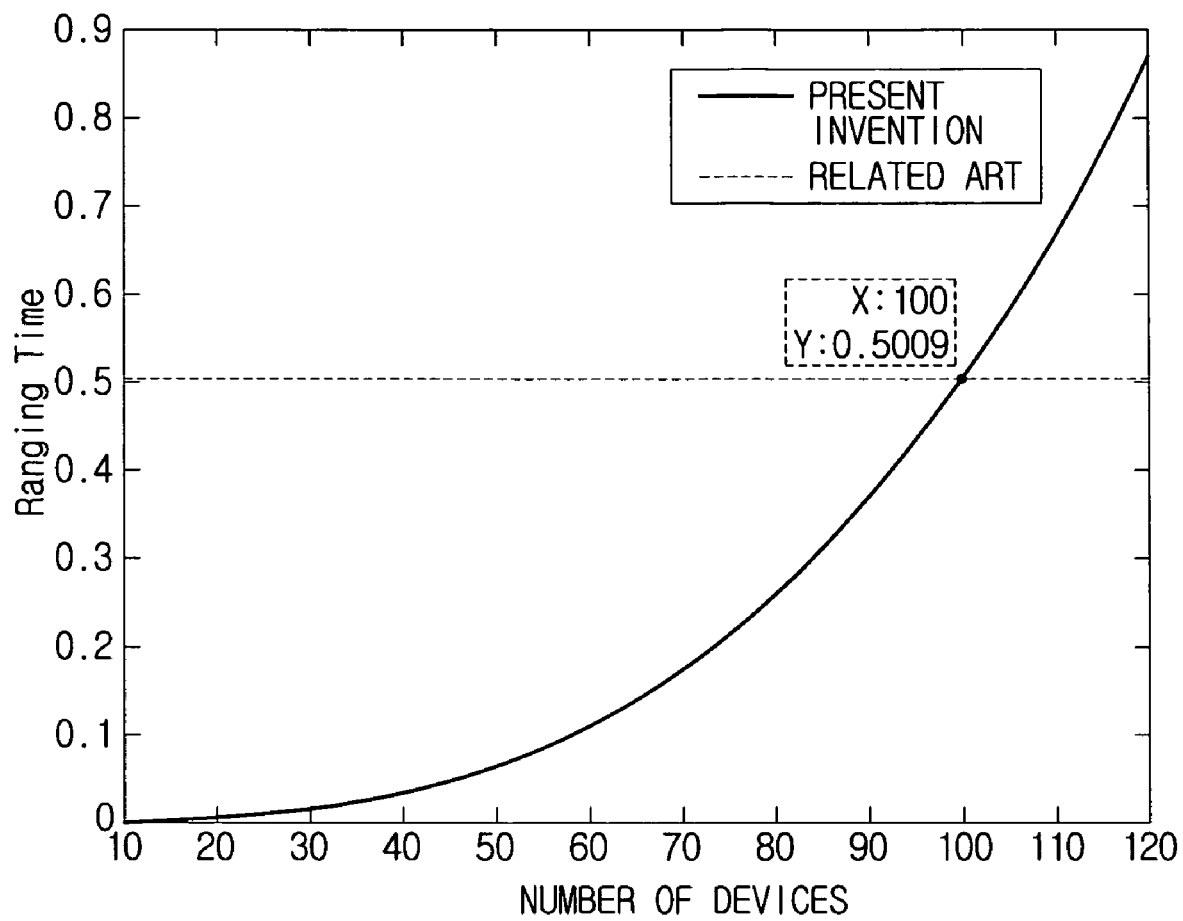
FIG. 5 is a graph showing the relationship between the number of devices requiring the ranging and the ranging time.
Figure 6:
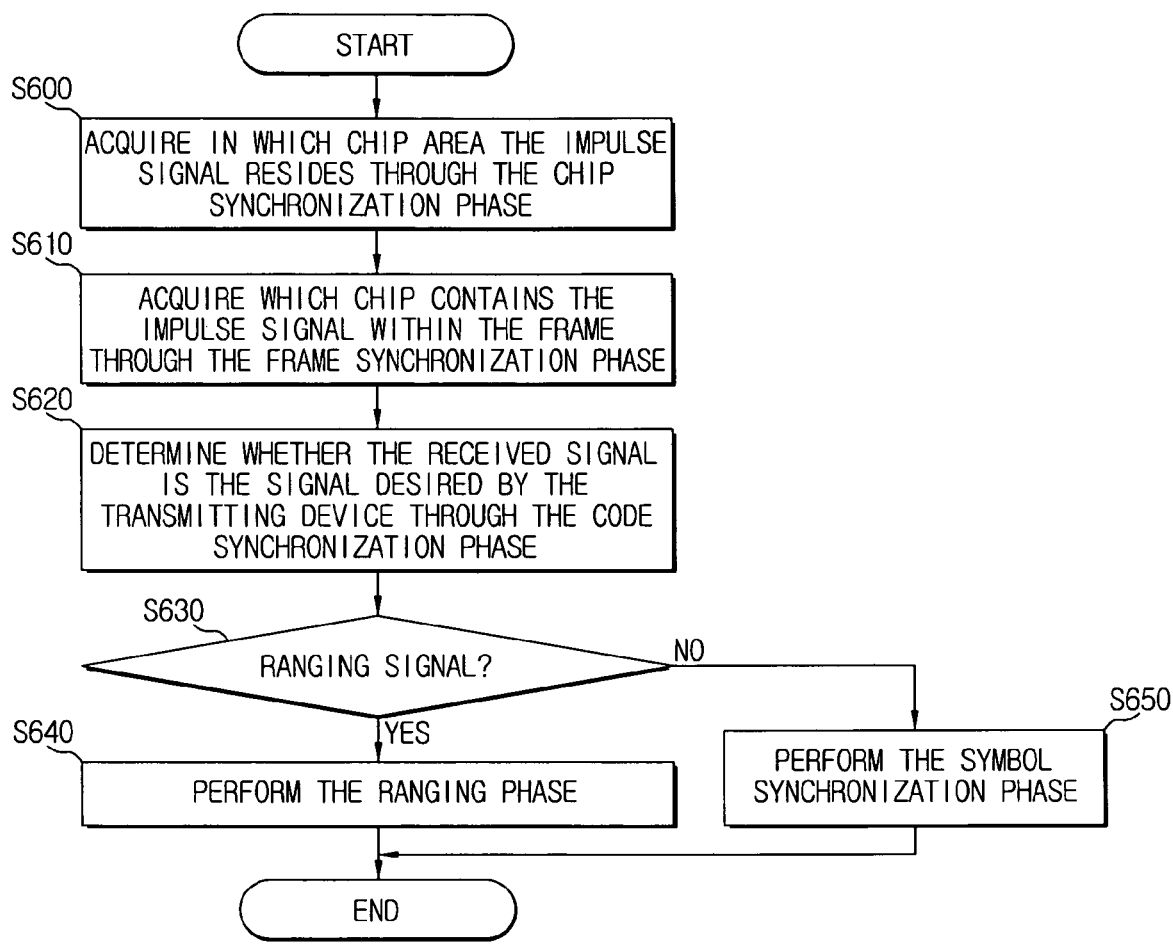
FIG. 6 is a flowchart outlining the synchronization and the ranging using the wireless communication system according to an exemplary, non-limiting embodiment of the present invention.

FIG. 5 is a graph showing the relationship between the number of devices requiring the ranging, and the ranging time. As shown in FIG. 5, the related art requires uniform ranging time regardless of the number of devices, whereas the wireless communication system of an exemplary embodiment of the present invention requires more ranging time as the number of devices increases. Therefore, when the WPAN is established less than one hundred devices, fast ranging is feasible.

The synchronization process of the wireless communication system for reducing the ranging time according to an exemplary embodiment of the present invention is now described.

First, the received signal squared at the squarer 10 is provided to the chip synchronization block 20. The chip synchronization block 20 integrates each chip in the plurality of frames within a TH code block, discovers where the integrated value exceeds the threshold, and thus acquires in which chip area the impulse signal resides (S600).

Next, the frame synchronization block 30 integrates each frame in the TH code block, discovers a chip of which the integrated value exceeds the threshold, and thus acquires which chip contains the impulse signal within the frame (S610).

The code synchronization block 40 multiplies the TH code discovered at the frame synchronization block 30 by the TH code generated at the TH code generator 43, and integrates the product. Next, the code synchronization block 40 calculates a plurality of integrated values by shifting the TH code by the TH code unit When a maximum value of the integral values exceeds the threshold, the code synchronization block 40 determines that the received signal is the signal desired by the transmitting device (S620). When the maximum value does not exceed the threshold, the chip synchronization phase and the frame synchronization phase are repeated.

As such, upon the completion of the process as far as the code synchronization block 40, when the received signal is the ranging signal (S630-Y), the ranging block 60 operates to measure the distance between the two devices by detecting the start point of the symbol (S640). By contest, when the received signal is the data communication signal (S630-N), the symbol synchronization phase progresses to detect the start and end points of the symbol (S650).

As set forth above, the wireless communication system for reducing the ranging time according to an exemplary embodiment of the present invention constructs the preamble using the TH code and the DS code and utilizes the preamble as the RF signal to measure the distance between the two devices. Thus, the symbol synchronization phase can be separated from the chip synchronization phase, the frame synchronization phase, and the code synchronization phase. Without having to perform the code synchronization phase during the ranging, the ranging time can be reduced.

Furthermore, since the RF signal is constructed using merely the preamble having a relatively short length, the channel occupation time can be shortened.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents. That is, while the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is given by the appended claims, rather than the preceding description, and all variations and equivalents which fall within the range of the claims are intended to be embraced therein.

What is claimed is:

1. A wireless communication system for reducing a ranging time, comprising:
    a plurality of devices transceiving signals for communications, the plurality of devices comprises a transmitting device which transmits a ranging signal, and a receiving device which receives the ranging signal,
    wherein at least one of the receiving devices comprises:
        a main synchronization block which determines whether a transceiving signal is a ranging signal,
        a ranging block which measures a distance between the transmitting device and the receiving device using the ranging signal; and
        a symbol synchronization block which detects a start point and an end point of a symbol forming the trasceived signal,
    wherein if the transceiving signal is the ranging signal, the main synchronization block provides the ranging signal to the ranging block without providing the ranging signal to the symbol synchronization block,
    wherein the transmitting device detects a position of respective devices from the ranging signal,
    wherein the transmitting device transmits the ranging signal formed of a preamble comprising:
        at least one chip which has an impulse signal indicative of information;
        at least one frame which is constructed using a plurality of chips and forms a code relating to a respective device depending on which chip contains the impulse signal;
        at least one time hopping (TH) code block which is constructed using a plurality of frames; and
        a direct sequence (DS) code block which forms one bit with the plurality of TH code blocks and is constructed using a plurality of bits, and
    wherein the main synchronization block group comprises:
        a chip synchronization block which determines in which chip the impulse signal resides;
        a frame synchronization block which determines in which chip the impulse signal resides within the frame; and
        a code synchronization block which acquires a TH code with respect to each frame in the TH code block and determines whether the acquired TH code matches a TH code generated at the transmitting device.

2. The wireless communication system of claim 1,
    wherein the ranging block which measures the distance between the transmitting device and the receiving device using the ranging signal detects only the start point of the symbol in the ranging signal; and
    wherein the symbol synchronization block which detects the start point and the end point of a symbol forming the trasceived signal when the transceived signal from the receiving device is a data communication signal.

3. The wireless communication system of claim 1, wherein the chip synchronization block comprises:
    a chip template generator which generates same chip template signal as the impulse signal generated at the transmitting device;
    a chip processor which calculates a value by multiplying a signal sequence, which is generated by integrating all chips in the frame and summing up the integrated values of all the chips within the TH code block, by the chip template signal generated at the chip template generator; and
    a chip determiner which determines whether the calculated value exceeds a predefined threshold.

4. The wireless communication system of claim 3, wherein, when the value exceeds the predefined threshold, the chip determiner determines that the impulse signal is generated in a corresponding position in the chip.

5. The wireless communication system of claim 4, wherein the chip synchronization block further comprises: a chip template shifter which designates a position of the chip template.

6. The wireless communication system of claim 5, wherein an interval at which the chip template is shifted by the chip template shifter is smaller than a width of the impulse signal.

7. The wireless communication system of claim 6, wherein, when the value does not exceed the predefined threshold, the chip determiner causes the chip template shifter to shift the position of the chip template.

8. The wireless communication system of claim 7, wherein, when the position of the chip template is shifted, the chip processor repeats the calculation of the value using the shifted chip template.

9. The wireless communication system of claim 8, wherein shifting the position of the chip template and calculating the value are repeated until the value exceeds the predefined threshold.

10. The wireless communication system of claim 9, further comprising:
    a first switch which is interposed between the chip determiner and the frame synchronization block, and which switches to feed the transceived signal to the frame synchronization block when the value exceeds the predefined threshold.

11. The wireless communication system of claim 3, further comprising:
    a clock controller which determines a cycle of the chip template generation, a frame template generation, and a TH code generation by controlling the chip template generator, a frame template generator, and a TH code generator.

12. The wireless communication system of claim 1, wherein the frame synchronization block comprises:
a frame template generator which generates a frame template which equals the chip in size;
a frame processor which calculates a value by multiplying a signal sequence, which is generated by integrating frames in the TH code block, by the frame template; and
a frame determiner which determines whether the value exceeds a predefined threshold.

13. The wireless communication system of claim 1, wherein the code synchronization block comprises:
a TH code generator which generates the same signal as the transceived signal which is originated from the transmitting device and transmitted to the receiving device;
a TH code processor which calculates a value by comparing the TH code of the TH code blocks, which is acquired at the frame synchronization block, with the signal generated at the TH code generator; and
a TH code determiner which determines whether the transceived signal is a signal desired by the transmitted device according to whether the value exceeds a predefined threshold.

14. The wireless communication system of claim 13, wherein the code synchronization block further comprises a TH code shifter which designates a position of the TH code from the TH code generator.

15. The wireless communication system of claim 14, wherein an interval at which the TH code is shifted by the TH code shifter is the same as the size of the TH code block.

16. The wireless communication system of claim 1, wherein the symbol synchronization block comprises:
a DS code generator which generates a signal forming the same DS code as a DS code which is generated at the transmitting device and transmitted to the receiving device;
a symbol processor which calculates a value by multiplying the transceived signal by the signal generated at the DS code generator; and
a DS code determiner which determines whether the symbol synchronization is completed by comparing the value calculated at the symbol processor with a predefined threshold.

17. The wireless communication system of claim 16, wherein, when the value exceeds the predefined threshold, the DS code determiner determines the completion of the symbol synchronization.

18. The wireless communication system of claim 17, wherein, when the symbol synchronization is completed, a verification operation is performed to verify whether timing information acquired from a receiving end is a symbol period of the signal sequence desired by the transmitting device.

19. The wireless communication system of claim 16, wherein, when the value falls below the predefined threshold, the DS code determiner calculates the value by repeatedly operating the DS code shifter and the symbol processor until the value exceeds the predefined threshold.

20. The wireless communication system of claim 1, wherein the ranging block comprises:
an energy detector which acquires a start point of the symbol by detecting an energy of the ranging signal; and
an estimator which measures the distance between the transmitting device and the receiving device using the start point of the symbol.

21. The wireless communication system of claim 1, further comprising:
a squarer which squares the transceived signal and provides the squared signal to the chip synchronization block, the frame synchronization block, and the code synchronization block.

22. The wireless communication system of claim 1, wherein the wireless communication system is a wireless personal area network (WPAN).

23. A wireless communication system for reducing a ranging time, comprising:
a plurality of devices transceiving signals for communications, the plurality of devices comprises a transmitting device which transmits a ranging signal, and a receiving device which receives the ranging signal,
wherein the transmitting device detects a position of respective devices from the ranging signal,
wherein the transmitting device transmits the ranging signal formed of a preamble comprising:
at least one chip which has an impulse signal indicative of information;
at least one frame which is constructed using a plurality of chips and forms a code relating to a respective device depending on which chip contains the impulse signal;
at least one time hopping (TH) code block which is constructed using a plurality of frames; and
a direct sequence (DS) code block which forms one bit with the plurality of TH code blocks and is constructed using a plurality of bits,
wherein at least one of the receiving devices comprises:
a main synchronization block group which processes a transceived signal and determines whether the transceived signal is a signal desired by the transmitting device when the receiving device re-transmits the transceived signal to the transmitting device;
a ranging block which measures a distance between the transmitting device and the receiving device using the ranging signal when the transceived signal is the desired signal of the transmitting device according to the determination of the main synchronization block group and when the transceived signal is the ranging signal; and
a symbol synchronization block which detects a start point and an end point of a symbol forming the trasceived signal when the transceived signal from the receiving device is a data communication signal,
wherein the main synchronization block group comprises:
a chip synchronization block which determines in which chip the impulse signal resides;
a frame synchronization block which determines in which chip the impulse signal resides within the frame; and
a code synchronization block which acquires a TH code with respect to each frame in the TH code block and determines whether the acquired TH code matches a TH code generated at the transmitting device,
wherein the frame synchronization block comprises:
a frame template generator which generates a frame template which equals the chip in size;
a frame processor which calculates a value by multiplying a signal sequence, which is generated by integrating frames in the TH code block, by the frame template; and
a frame determiner which determines whether the value exceeds a predefined threshold, and wherein, when the value exceeds the predefined threshold, the frame determiner determines that the impulse signal is contained in a corresponding chip in the frame.

24. The wireless communication system of claim 23, wherein the frame synchronization block further comprises a frame template shifter which designates a position of the frame template.

25. The wireless communication system of claim 24, wherein an interval at which the frame template is shifted by the frame template shifter is the same as the size of the chip.

26. The wireless communication system of claim 25, wherein, when the value does not exceed the predefined threshold, the frame determiner causes the frame template shifter to shift the position of the frame template.

27. The wireless communication system of claim 26, wherein, when the position of the frame template is shifted, the frame processor repeats the calculation of the value using the shifted frame template.

28. The wireless communication system of claim 27, wherein the shifting of the position of the frame template and the calculating of the value are repeated until the value exceeds the predefined threshold.

29. The wireless communication system of claim 28, further comprising:
a second switch which is interposed between the frame determiner and the code synchronization block, and switches to feed the transceived signal to the code synchronization block when the value exceeds the predefined threshold.

30. A wireless communication system for reducing a ranging time, comprising:
a plurality of devices transceiving signals for communications, the plurality of devices comprises a transmitting device which transmits a ranging signal, and a receiving device which receives the ranging signal,
wherein the transmitting device detects a position of respective devices from the ranging signal,
wherein the transmitting device transmits the ranging signal formed of a preamble comprising:
at least one chip which has an impulse signal indicative of information;
at least one frame which is constructed using a plurality of chips and forms a code relating to a respective device depending on which chip contains the impulse signal;
at least one time hopping (TH) code block which is constructed using a plurality of frames; and
a direct sequence (DS) code block which forms one bit with the plurality of TH code blocks and is constructed using a plurality of bits,
wherein at least one of the receiving devices comprises:
a main synchronization block group which processes a transceived signal and determines whether the transceived signal is a signal desired by the transmitting device when the receiving device re-transmits the transceived signal to the transmitting device;
a ranging block which measures a distance between the transmitting device and the receiving device using the ranging signal when the transceived signal is the desired signal of the transmitting device according to the determination of the main synchronization block group and when the transceived signal is the ranging signal; and
a symbol synchronization block which detects a start point and an end point of a symbol forming the transceived signal when the transceived signal from the receiving device is a data communication signal,
wherein the main synchronization block group comprises:
a chip synchronization block which determines in which chip the impulse signal resides;
a frame synchronization block which determines in which chip the impulse signal resides within the frame; and
a code synchronization block which acquires a TH code with respect to each frame in the TH code block and determines whether the acquired TH code matches a TH code generated at the transmitting device,
wherein the code synchronization block comprises:
a TH code generator which generates the same signal as the transceived signal which is originated from the transmitting device and transmitted to the receiving device;
a TH code processor which calculates a value by comparing the TH code of the TH code blocks, which is acquired at the frame synchronization block, with the signal generated at the TH code generator; and
a TH code determiner which determines whether the transceived signal is a signal desired by the transmitted device according to whether the value exceeds a predefined threshold,
wherein the code synchronization block further comprises a TH code shifter which designates a position of the TH code from the TH code generator,
wherein an interval at which the TH code is shifted by the TH code shifter is the same as the size of the TH code block, and
wherein, when the position of the TH code is shifted, the TH code processor acquires a plurality of values by repeatedly calculating the value using the shifted TH code.

31. The wireless communication system of claim 30, wherein, when a maximum value of the values exceeds a threshold, the TH code determiner determines that the transceived signal is a signal desired by the transmitting device.

32. The wireless communication system of claim 30, wherein, when the maximum value of the values does not exceed the threshold, the TH code determiner causes the chip synchronization block and the frame synchronization block to repeat the synchronization.

33. The wireless communication system of claim 30, further comprising:
a third switch which is interposed among the TH code determiner, the symbol synchronization block, and the ranging block,
wherein, when the maximum value of the values exceeds the threshold, the third switch feeds a ranging signal to the ranging block when the transceived signal is the ranging signal, and feeds the transceived signal to the symbol synchronization block when the transceived signal contains communication data.

34. A wireless communication system for reducing a ranging time, comprising:
a plurality of devices transceiving signals for communications, the plurality of devices comprises a transmitting device which transmits a ranging signal, and a receiving device which receives the ranging signal,
wherein the transmitting device detects a position of respective devices from the ranging signal,
wherein the transmitting device transmits the ranging signal formed of a preamble comprising:
at least one chip which has an impulse signal indicative of information;

at least one frame which is constructed using a plurality of chips and forms a code relating to a respective device depending on which chip contains the impulse signal;

at least one time hopping (TH) code block which is constructed using a plurality of frames; and a direct sequence (DS) code block which forms one bit with the plurality of TH code blocks and is constructed using a plurality of bits, wherein at least one of the receiving devices comprises:

a main synchronization block group which processes a transceived signal and determines whether the transceived signal is a signal desired by the transmitting device when the receiving device re-transmits the transceived signal to the transmitting device;

a ranging block which measures a distance between the transmitting device and the receiving device using the ranging signal when the transceived signal is the desired signal of the transmitting device according to the determination of the main synchronization block group and when the transceived signal is the ranging signal; and a symbol synchronization block which detects a start point and an end point of a symbol forming the trasceived signal when the transceived signal from the receiving device is a data communication signal, wherein the symbol synchronization block comprises:

a DS code generator which generates a signal forming the same DS code as a DS code which is generated at the transmitting device and transmitted to the receiving device;

a symbol processor which calculates a value by multiplying the transceived signal by the signal generated at the DS code generator; and a DS code determiner which determines whether the symbol synchronization is completed by comparing the value calculated at the symbol processor with a predefined threshold, and wherein the symbol synchronization block further comprises a DS code shifter which shifts the signal generated at the DS code generator by one bit.

35. The wireless communication system of claim 34, wherein the symbol processor calculates the value by multiplying the transceived signal and a shifted signal every time the DS code shifter shifts the signal by one bit.

36. A method for reducing ranging time in a wireless communication system comprising:

processing a transceived signal to determine whether the transceived signal is a ranging signal;

if the determined transceived signal is the ranging signal, measuring a distance between the transmitting device and the receiving device using the ranging signal; and if the determined transceived signal is a data communication signal, detecting a start point and an end point of a symbol forming the trasceived signal, wherein if the determined transceived signal is the ranging signal, the end point of the symbol forming the trasceived signal is not detected, wherein the ranging signal is formed of a preamble and which comprises: at least one chip which has an impulse signal indicative of information, at least one frame which is constructed using a plurality of chips and forms a code relating to a respective device depending on which chip contains the impulse signal, at least one time hopping (TH) code block which is constructed using a plurality of frames, a direct sequence (DS) code block which forms one bit with the plurality of TH code blocks and is constructed using a plurality of bits, and wherein the processing comprises:

determining in which chip an impulse signal resides;

determining in which chip the impulse signal resides within a frame;

acquiring a TH code with respect to each frame in the TH code block; and determining whether the acquired TH code matches a TH code generated at the transmitting device.

37. The method for reducing ranging time in a wireless communication system of claim 36, wherein the processing further comprises:

generating a frame template which equals the chip in size;

calculating a value by multiplying a signal sequence, which is generated by integrating frames in the TH code block, by the frame template; and determining whether the value exceeds a predefined threshold.

38. The method for reducing ranging time in a wireless communication system of claim 37, wherein the processing further comprises:

generating the same signal as the transceived signal which is originated from the transmitting device and transmitted to the receiving device;

calculating a value by comparing the TH code of the TH code blocks with the signal generated at the TH code generator; and determining whether the transceived signal is a signal desired by the transmitted device according to whether the value exceeds a predefined threshold.

\* \* \* \* \*